(12) United States Patent
Kelley et al.

(10) Patent No.: US 10,859,541 B2
(45) Date of Patent: Dec. 8, 2020

(54) TEXTURED NEEDLE FOR IMPROVED PIERCING PERFORMANCE IN LIQUID CHROMATOGRAPHY APPLICATIONS

(71) Applicant: Waters Technologies Corporation, Milford, MA (US)

(72) Inventors: Scott Kelley, Brookline, MA (US); Peter Osswald, Whitinsville, MA (US); Rose Solow, Wellesley, MA (US); John M. Auclair, Seekonk, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 16/292,857

(22) Filed: Mar. 5, 2019

(65) Prior Publication Data

US 2019/0277812 A1 Sep. 12, 2019

Related U.S. Application Data

(60) Provisional application No. 62/639,305, filed on Mar. 6, 2018.

(51) Int. Cl.
*G01N 30/18* (2006.01)
*G01N 30/20* (2006.01)
(Continued)

(52) U.S. Cl.
CPC .............. *G01N 30/18* (2013.01); *B01D 15/14* (2013.01); *B23K 26/0006* (2013.01); *B23K 26/282* (2015.10); *B23K 26/3584* (2018.08); *B29C 66/30322* (2013.01); *B29C 66/73161* (2013.01); *G01N 30/20* (2013.01); *G01N 30/24* (2013.01); *B23K 2101/06* (2018.08); *B23K 2101/20* (2018.08)

(58) Field of Classification Search
CPC ........ G01N 30/18; G01N 30/24; G01N 30/20; B29C 66/30322; B29C 66/73161; B23K 26/3584; B23K 26/0006; B23K 26/282; B23K 2101/06; B23K 2101/20; B01D 15/14

See application file for complete search history.

(56) References Cited

U.S. PATENT DOCUMENTS

| 6,214,030 B1 * | 4/2001 | Matsutani ........ A61B 17/06066 606/223 |
| 2010/0107783 A1 | 5/2010 | Maeda |
| 2014/0213958 A1 * | 7/2014 | Clauson .............. A61F 9/00781 604/8 |

FOREIGN PATENT DOCUMENTS

| CN | 204600539 U | 9/2015 |
| EP | 2423679 A1 | 2/2012 |

OTHER PUBLICATIONS

International Search Report and Written Opinion for application No. PCT/US2019/020699 dated Jun. 7, 2019.
(Continued)

*Primary Examiner* — Suman K Nath
(74) *Attorney, Agent, or Firm* — Schmeiser, Olsen & Watts LLP; Jason A. Murphy

(57) ABSTRACT

A needle for aspirating a sample from a sample source and injecting the sample into a liquid chromatography system, the needle including a needle body having a rough textured surface finish for at least a portion of the needle body, wherein the rough textured surface finish reduces a coefficient of friction of the needle body, is provided. Furthermore, an associated method is also provided.

19 Claims, 9 Drawing Sheets

(51) Int. Cl.
*B01D 15/14* (2006.01)
*B29C 65/00* (2006.01)
*B23K 26/282* (2014.01)
*B23K 26/00* (2014.01)
*B23K 26/352* (2014.01)
*G01N 30/24* (2006.01)
*B23K 101/20* (2006.01)
*B23K 101/06* (2006.01)

(56) References Cited

OTHER PUBLICATIONS

International Preliminary Report on Patentability in PCT/US19/20699 dated Sep. 17, 2020.

\* cited by examiner

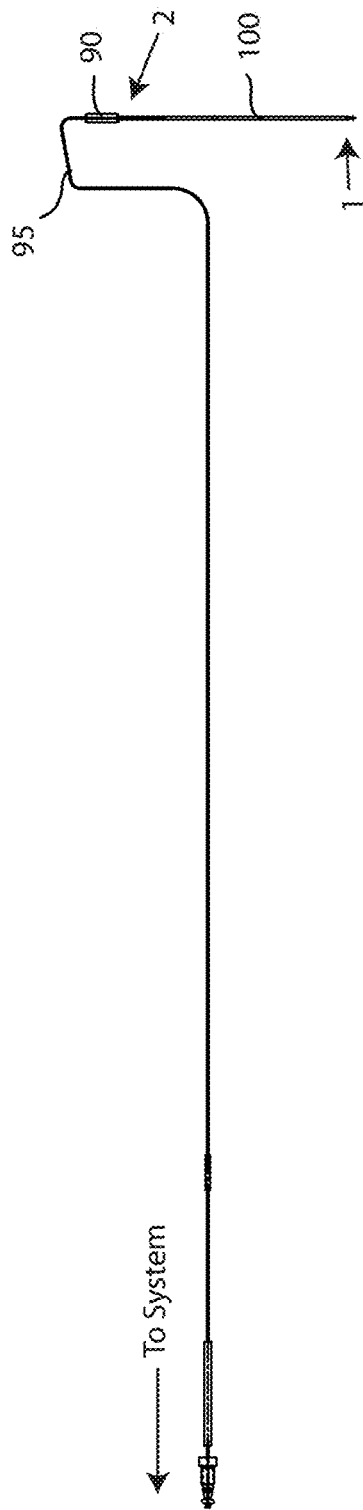
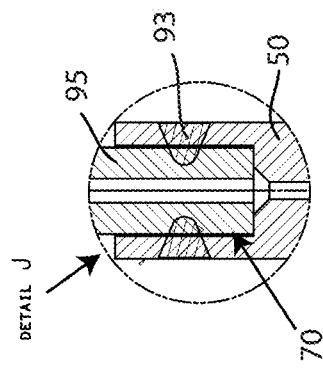
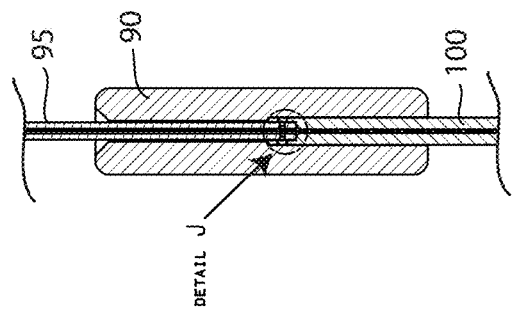
FIG. 7
FIG. 9
FIG. 8

TEXTURED NEEDLE FOR IMPROVED PIERCING PERFORMANCE IN LIQUID CHROMATOGRAPHY APPLICATIONS

CROSS-REFERENCE TO RELATED APPLICATIONS

This application claims priority to U.S. Provisional 62/639,305 filed on Mar. 6, 2018 and titled "Textured Needle for Improved Piercing Performance in Liquid Chromatography," the entirety of which is incorporated by reference herein.

FIELD OF TECHNOLOGY

The following relates to embodiments of a textured needle, and more specifically to embodiments of a sample needle for liquid chromatography systems having a rough textured surface region.

BACKGROUND

Liquid chromatography is a technique in analytic chemistry where distinct components of a mixture are identified by separating the individual components by passing the mixture through an adsorbent medium using fluid flow so that the components elute at different rates. Liquid chromatography systems are typically comprised of a solvent delivery pump, an autosampler, a column, and a detector. The solvent delivery pump pumps mobile phase fluid through the system, the autosampler introduces the sample to be analyzed to the analytic flow path, the column contains the adsorbent packing material used to effect separation, and the detector detects the separated components as they elute out of the column.

Samples for chromatographic analysis can be stored in either vials or wellplates. Wellplates are typically flat, rectangular plates with an array of wells that hold the samples. Often times, seals are applied to a top surface of the wellplates over the openings of the wells to better contain the samples. The wellplates are inserted into liquid chromatography autosamplers, where a needle is inserted into the individual wells to aspirate the sample contained in the wellplate, and then to insert the sample into a flow path for chromatographic analysis. When a wellplate in an autosampler has a seal, the needle must pierce through the seal to aspirate the sample, but needle does not always cleanly pierce through the seal and instead the seal material will stretch before tearing leaving material wrapped around the tip of the needle. The torn material remaining on the needle tip can cause clogs when the needle aspirates the sample or inserts the sample into the analytic flow path.

Thus, a need exists for eliminating clogs resulting from sample source seals remaining on the needle, in liquid chromatography applications.

SUMMARY

A first aspect relates generally to a needle for aspirating a sample from a sample source and injecting the sample into a liquid chromatography system, the needle comprising: a needle body having a rough textured surface finish, wherein the rough textured surface finish reduces a coefficient of friction of the needle body.

A second aspect relates generally to an autosampler of a liquid chromatography system, comprising: an injection valve for injecting a sample into an analytic flowpath of the liquid chromatography system, a sample compartment, the sample compartment configured to receive at least one sample source having a seal, and a sample needle fluidically connected to the injection valve, the sample needle configured to aspirate the sample from the at least one sample source by piercing the seal of the at least one sample source, and then injecting the sample into the analytic flowpath of the liquid chromatography system, wherein the sample needle has a textured exterior surface.

A third aspect relates generally to a method of improving a piercing performance of a needle in a liquid chromatography system, the method comprising: reducing a coefficient of friction of the needle by forming a rough textured surface region on an exterior surface of the needle, such that when the needle pierces a seal of a sample source, the seal does not cling to the rough textured surface region of the needle as a result of the reduced coefficient of friction.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 7 depicts a textured needle attached to a tubing of a liquid chromatography system, in accordance with embodiments of the present invention;

FIG. 8 depicts an enlarged view of FIG. 7, showing the tubing connected to the textured needle, in accordance with embodiments of the present invention;

FIG. 9 depicts a detailed view of Detail J of FIG. 8, in accordance with embodiments of the present invention.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
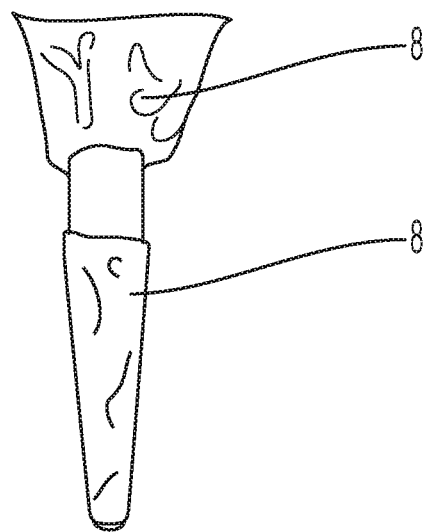
FIG. 1 depicts a current needle design with a smooth exterior surface piercing a seal of a sample source, wherein portions of a seal material are clinging to the needle.
Figure 2:
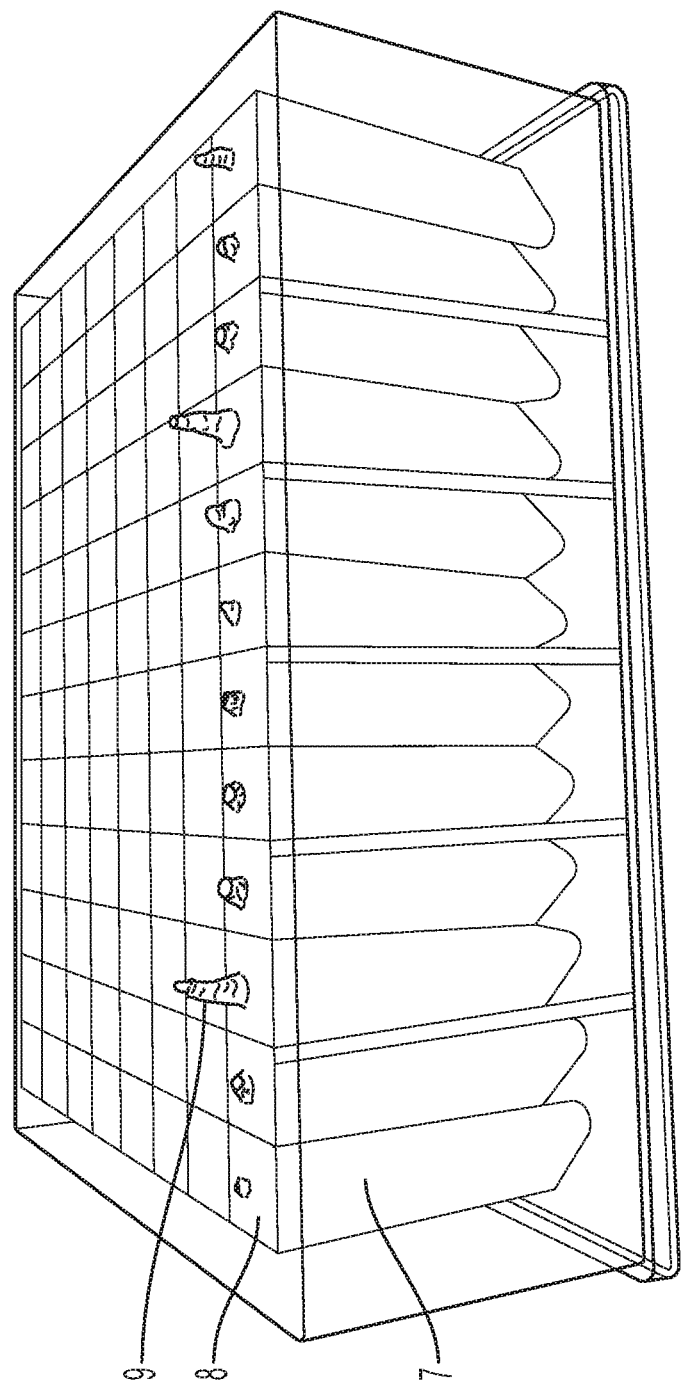
FIG. 2 depicts severely stretched leftover seal material on a sample source, caused by unwanted clinging of the seal material onto the current needle of FIG. 1.

Referring to the drawings, FIG. 1 depicts a current needle design with a smooth exterior surface piercing a seal of a sample source, wherein portions of a seal material 8 are clinging to the needle. It has been determined that a high coefficient of friction on a smooth exterior of current needle designs for liquid chromatography applications causes certain plastic seals 8 of a sample source to cling to the smooth exterior surface of the needle, and stretch around the needle during piercing, as shown in FIG. 1. The stretching and clinging of the seal material 8 can results in parts of the seal material 8 to break-off, resulting in unwanted plastic sleeves, pieces, objects, wads, etc. caught on the needle tip, which may clog, block, or otherwise disrupt an injection into a system, such an a high performance liquid chromatography system. In particular, a smooth surface produces a gage block effect between the needle and the seal during piercing so that the seal clings to the surface of the needle and stretches as the needle is lowered in to the well. FIG. 2 depicts stretched, leftover seal material 9 on a sample source 7, such as a wellplate, caused by unwanted clinging of the seal material onto the current needle of FIG. 1.

Figure 3:
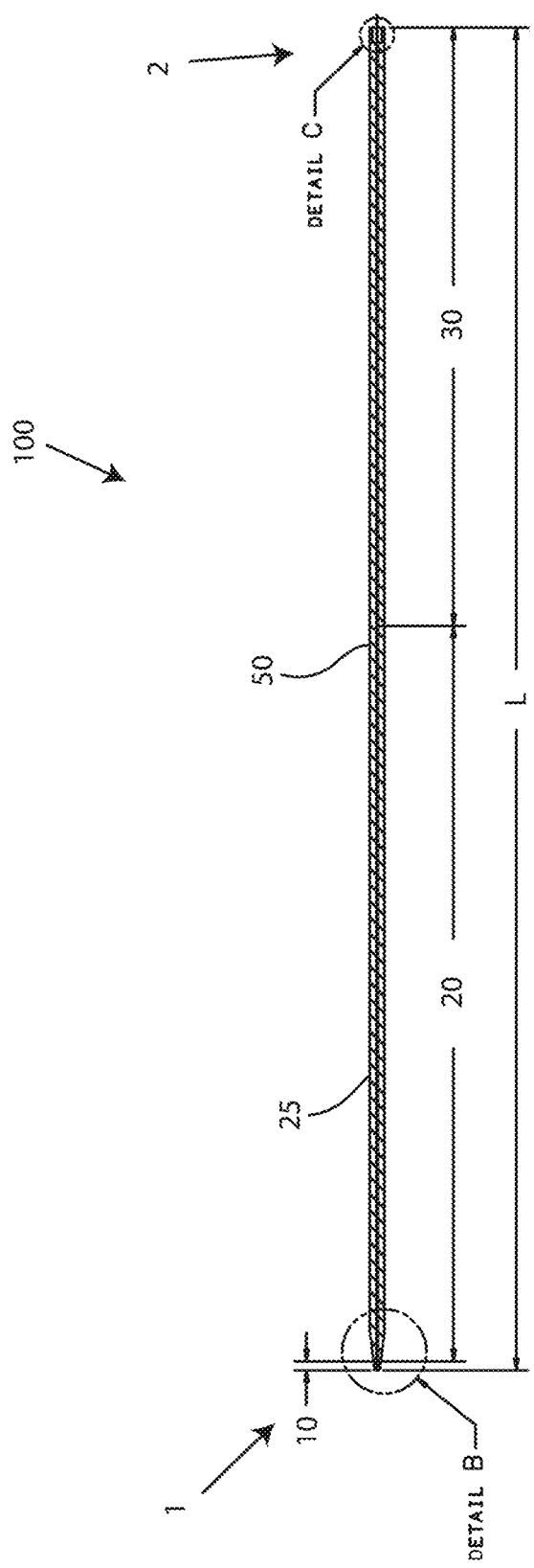
FIG. 3 depicts a cross-sectional view of a needle in accordance with embodiments of the present invention.

Referring now to FIG. 3, which depicts a cross-sectional view of a needle 100 in accordance with embodiments of the present invention. Embodiments of needle 100 may be a needle, a sample needle, an injection needle, a textured needle, a liquid chromatography needle, an autosampler needle, an injector, a sample injector, and the like. Embodiments of the needle 100 may include a first end 1, a second end 2, and a needle body 50. Embodiments of the needle body 50 may be a body, a body portion, or other structural element that defines a general structure of the needle 100. The needle body 50 of the needle 100 may have an overall length, L. The overall length, L, may vary depending on the application, a size of a sample compartment of an autosampler, a volume of sample to be analyzed, etc. In an exemplary embodiment, the overall length, L, may be between 3-4 inches (7.62 cm-10.16 cm). Embodiments of the needle 100 may be comprised of metal, metal alloy, metal alloys, or a combination thereof. In an exemplary embodiment, the needle 100 may be comprised of stainless steel or a chromium alloy, such as MP35N®.

Moreover, embodiments of the needle 100, or the needle body 50, may include a smooth surface region 10, a textured surface region 20, and a non-textured region 30. In an exemplary embodiment, the needle 100 may be a needle for aspirating a sample from a sample source 7 and injecting the sample into a liquid chromatography system, wherein the needle 100 includes a needle body 50 having a rough textured surface finish 25 applied to the textured region 20, which may be offset from a tip of the needle body 50 by the smooth surface region 10, wherein the rough textured surface finish 25 reduces a coefficient of friction of the needle body 50. By reducing the coefficient of friction of the needle 100, at least in the area of the textured region 20, a friction between the needle body 50 and the seal 8 can be reduced to prevent, hinder, or otherwise reduce a likelihood of a stretching of the seal 8 (e.g. plastic seal material over a wellplate) as the needle 100 pierces the seal 8 to aspirate the sample from within the sample source 7.

Figure 4:
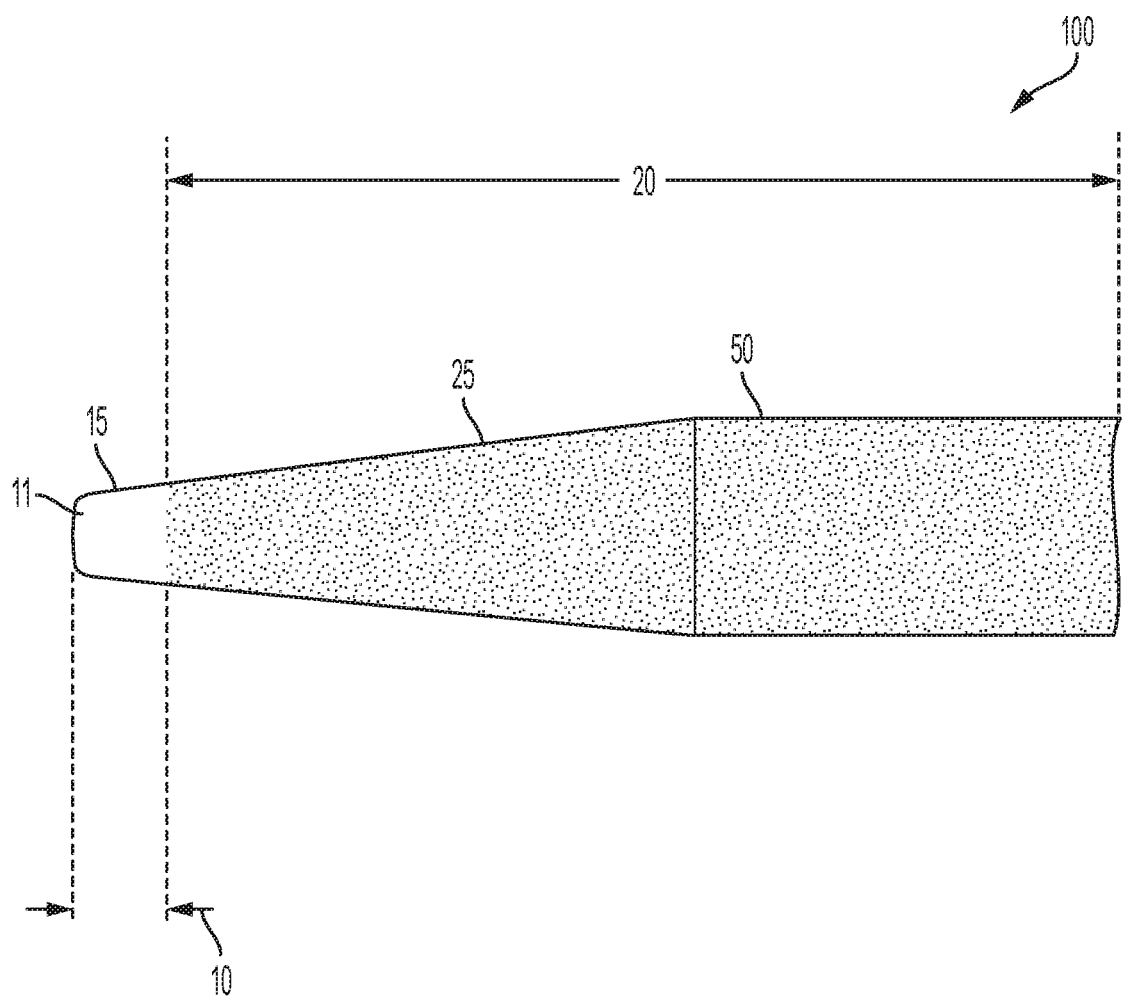
FIG. 4 depicts a perspective view of the needle in FIG. 3, in accordance with embodiments of the present invention.

With continued reference to FIG. 3, and additional reference to FIG. 4, which depicts a perspective view of the needle in FIG. 3, in accordance with embodiments of the present invention, embodiments of the needle 100 may include a smooth surface region 10. Embodiments of the smooth surface region 10 may be a region, portion, section, etc. of an exterior surface of the needle body 50 having a smooth surface, or smooth surface finish 15. The smooth surface finish 15 may have a max surface roughness Ra of 16 µinch (0.4064 µm). Furthermore, the smooth surface region 10 may be proximate a tip 11 of the needle body 50. In an exemplary embodiment, the smooth surface region 10 may encompass the tip 11 of the needle body 50. The tip 11 of the needle body 50 may be a tip, a nose, an aspirating end of the needle body 50, and the like, which may be configured to initially engage and pierce a cover seal 8 of a sample source 7. The smooth surface region 10 of the needle body 50 may extend from the first end 1 of the needle 100, or from a tip 11 of the needle body 50 a distance, prior to reaching the textured surface region 20. In an exemplary embodiment, the smooth surface region 10 may extend at least 0.01 inches (0.0254 cm) from the first end 1 of the needle 100. In another exemplary embodiment, the smooth surface region 10 may extend 0.025 inches±0.15 inches (0.065 cm±0.381 cm) from the first end 1 of the needle 100. In another exemplary embodiment, the smooth surface region 10 may extend from the first end 1 of the needle 100 less than 0.01 inches (0.0254 cm).

Embodiments of the needle 100 may include the smooth surface region 10 so that smooth surface finish 15 of the tip 11 maintains a liquid tight seal between the tip 11 of the needle body 50 and an injection seat when the needle injects the sample into an analytic flow path of the liquid chromatography system. Preserving a smooth surface finish 15 on the tip 11 of the needle body 50 can maintain a proper sealing when the needle 100 inserts the sample in to the analytic flow path. For example, after the needle 100 aspirates the sample, the needle 100 moves to an inject station where the needle 100 is loaded against an inject seat creating a liquid-tight seal during injection. A smooth surface finish 15 on the needle tip 11 may ensure that a liquid tight seal forms between the needle tip 11 and the inject seat during injection.

Referring still to FIGS. 3 and 4, embodiments of the needle body 50 may include a textured surface region 20. Embodiments of the textured surface region 20 may be a textured region, a rough surface texture region, a region of reduced coefficient of friction, an enhanced surface roughness region, a region of increased roughness, and the like. The textured surface region 20 may reside next to or contiguous with the smooth surface region 10 along the exterior surface of the needle 100. Further, the textured surface region 20 may be offset a distance from the tip 11 of the needle body 50. Because the textured surface region 20 is offset from the tip 11 of the needle body 50, a smooth surface finish 15 is preserved at the tip, while a total surface area of smooth surface finish of the needle 100 that causes problems with clinging of the seal material of the sample source 8 as described above, is limited.

In the textured surface region 20 of the needle body 50, an exterior surface of the needle 100 may include a rough surface texture finish 25. Embodiments of the rough surface texture finish 25 may have a roughness Ra greater than 15 µinch (0.3810 µm). In an exemplary embodiment, the rough surface texture finish 25 may have a roughness Ra between 15 µinch (0.3810 µm) and 30 µinch (0.7620 µm). Embodiments of the rough surface texture finish 25 may have a roughness Ra greater than 30 μinch (0.7620 μm), but a surface roughness Ra of the textured surface finish 25 may be limited because a surface that has been overly roughened will increase the coefficient of friction and the seal material may still cling and stretch. For instance, the textured surface finish 25 may have a max Ra of 80 μinch (2.032 μm). By applying a rough textured surface finish 25 to an exterior surface of a needle 100, a coefficient of friction is reduced so that the plastic seal material 8 does not stretch or sleeve during piercing of the seal 8 of the sample source 7. The addition of a textured surface finish 25 to the exterior of the needle body 50 may improve on current needle designs by improving piercing performance and decreasing a number of failures due to stretching or sleeving of plastic seals (e.g. wellplate seal).

Various methods may be used to form the rough surface texture finish 25 or otherwise roughen or texture the exterior surface of the needle body 50 in the textured surface region. In one embodiment, the textured surface finish 25 may be created using a bead blast technique. For example, the exterior surface of the needle body 50 may be bead blasted by spraying glass beads at a specific pressure to form the surface texture finish 25. During the process of bead blasting, measurements may be taken to ensure that the roughness Ra falls within a certain range (e.g. 15 μinch-30 μinch/0.381 μm-0.762 μm). In another embodiment, the textured surface finish 25 may be created using shot peening methods. For example, the surface texture may be formed using shot peening processes involving bombarding the needle body 50 with a stream of stainless steel balls being at a specific pressure to form the surface texture finish 25. In another embodiment, the textured surface may be formed using a laser etching process. In further embodiments, the textured surface may be formed by a grinding technique. Other surface texturing and/or roughening methods may be used to accomplish a surface roughness Ra of the needle 100 described herein.

Referring back to FIG. 3, embodiments of the needle body 50 may also include a non-textured region 30. Embodiments of the non-textured region 30 may potentially comprise a region, section, portion, etc. of the needle body 50 residing next to or contiguous with the textured surface region 20 between the textured surface region 20 and the second end 2 of the needle 100. The non-textured region 30 may have a same roughness Ra as the smooth surface region 10 proximate the tip, or a different roughness Ra than both the smooth surface region 10 and the textured region 20. In some embodiments, the needle 100 may not have a non-textured region 30, wherein the needle body 50 comprised the rough surface texture finish 25 from an edge of the smooth surface region 10 to the second end 2 of the needle 100. Furthermore, in exemplary embodiments, an entire needle body 50 may be comprised of the textured region 20. In another exemplary embodiment, the needle body 50 may not include a smooth surface finish proximate the needle tip 11, and may instead be textured as in the textured region 20. For example, the textured region 20 may extend from a point between the first end 1 and the second end 2 of the needle body 50 to the tip 11 of the needle body 50. Embodiments of the needle body 50 may thus be textured starting at a tip 11 of the needle body 50 and continuing for a certain length from the tip 11, and even up to the second end 2 of the needle body 50.

Figure 5:
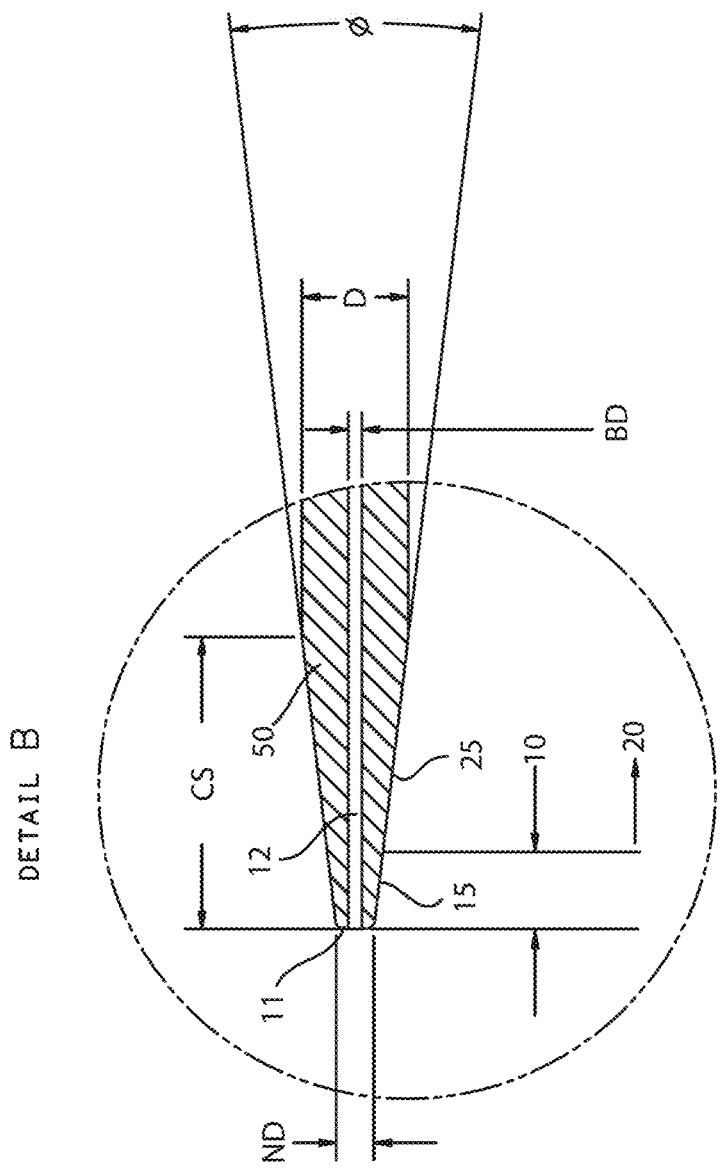
FIG. 5 depicts a detailed view of Detail B of FIG. 3, in accordance with embodiments of the present invention.

FIG. 5 depicts a detailed view of Detail B of FIG. 3, in accordance with embodiments of the present invention. The detailed view of FIG. 5 depicts the tip 11 of the needle body 50, the smooth surface region 10 and a portion of the textured surface region 20. Embodiments of the tip 11 may have a diameter, referred to as a nose diameter ND. The ND may be a diameter of the needle body 50 at the tip 11. In an exemplary embodiment, the ND may be about 0.014 inches (0.03556 cm). A diameter D of the needle body 50 may be a max diameter of the needle body 50. The max diameter D of the needle body 50 may vary. In exemplary embodiments used in liquid chromatography autosamplers, the max needle diameter D may be about 0.04 inches (0.1016 cm). Furthermore, embodiments of the needle 100 may include an inner fluidic pathway 12. Embodiments of the inner fluidic pathway 12 may be an inner bore extending generally axially through the needle 100. In liquid chromatography applications, the sample from the sample source 7 may flow through the fluidic pathway 12. Embodiments of the fluidic pathway 12 may have a bore diameter BD that may vary depending on a volume of sample to be tested. In some embodiment, the BD of the fluidic pathway 12 of the needle 100 may be about 0.005 inches (0.0127 cm). In other embodiments, the BD may be about 0.010 inches (0.0254 cm). In yet another embodiment, the max diameter of the inner bore is 0.01 inches (0.0254 cm). Moreover, embodiments of the needle body 50 may include a conical section CS. Embodiments of a conical section CS may be a portion of the needle body 50 that tapers towards the needle tip 11. A majority of the needle body 50 may have a uniform max diameter D, but the conical section CS may have a gradually reducing max diameter moving towards the tip 11 of the needle body 50. A length of the conical section CS of the needle body 50 may vary. In an exemplary embodiment, the length of the CS may be about 0.10 inches (0.0254 cm). An angle, φ, of the CS of the needle body 50 may be less than 15°. However, the angle, φ, may vary and be greater than 15°.

Figure 6:
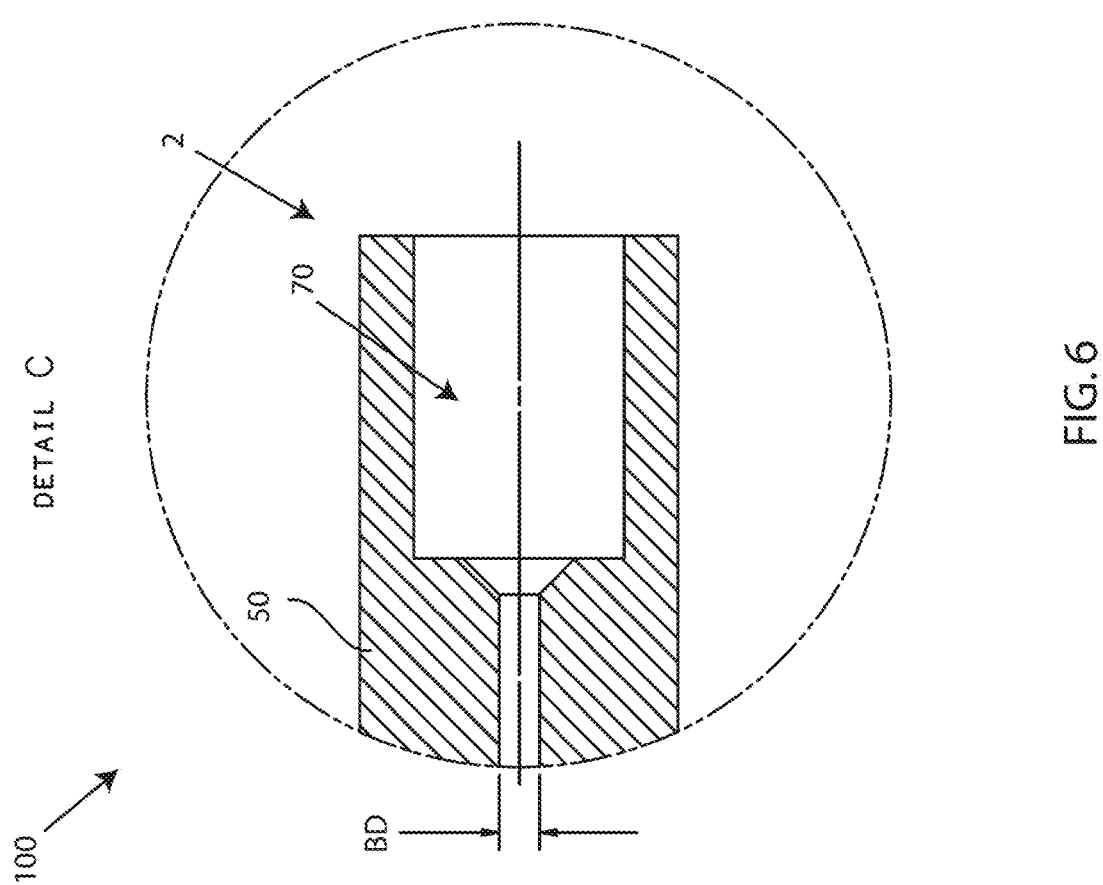
FIG. 6 depicts a detailed view of Detail C of FIG. 3, in accordance with embodiments of the present invention.

FIG. 6 depicts a detailed view of Detail C of FIG. 3, in accordance with embodiments of the present invention. The detailed view of FIG. 6 depicts the second end 2 of the needle body 50. Embodiments of the needle body 50 may include a component attachment region 70. Embodiments of the component attachment region 70 may be configured to receive a component, fastener, element, part, etc. of a liquid chromatography system. FIG. 7 depicts a textured needle 100 attached to a tubing 95 of a liquid chromatography system, in accordance with embodiments of the present invention. The needle 100 may be operably connected to a tubing 95 of a liquid chromatography system. A ferrule 90 may surround portions of the tubing 95 and the needle 100. FIG. 8 depicts an enlarged view of FIG. 7, showing the tubing 95 connected to the textured needle 100, in accordance with embodiments of the present invention. The needle 100 may be welded to the tubing 95. In an exemplary embodiment, the needle 100 may be laser welded to the tubing 95. FIG. 9 depicts a detailed view of Detail J of FIG. 8, in accordance with embodiments of the present invention. The component attachment region 70 of the needle body 50 may receive an end of tubing 95, which may be laser welded (welding spots shown schematically as 93). Thus, embodiments of the needle 100 may be operably connected to a tubing 95 of a liquid chromatograph system.

Figure 10:
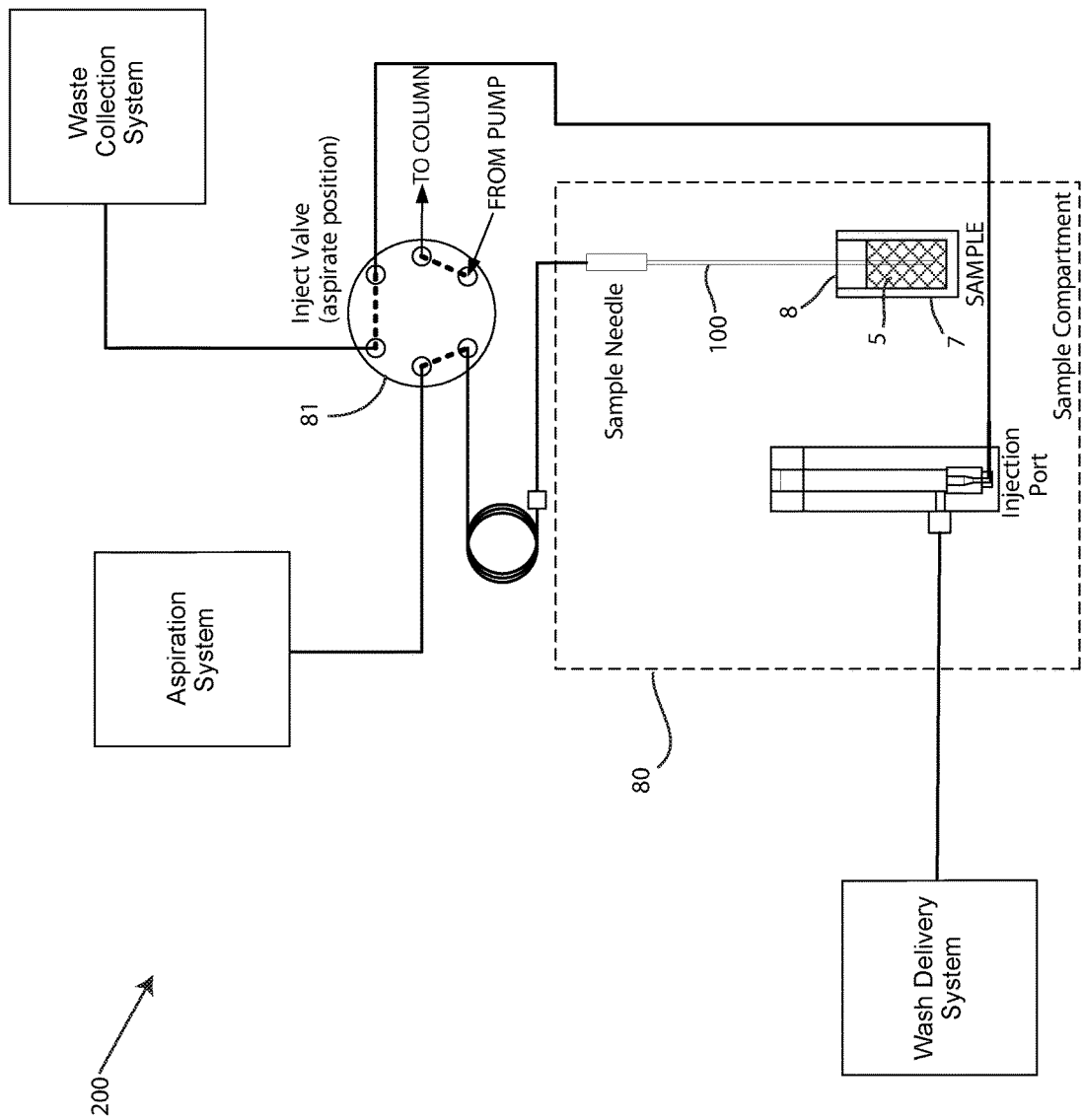
FIG. 10 depicts a schematic fluidic diagram of an autosampler of a liquid chromatography system, having a needle of FIG. 3, in accordance with embodiments of the present invention.

Referring now to FIG. 10 which depicts a schematic fluidic diagram of an autosampler 200 of a liquid chromatography system, having a needle 100 of FIG. 3, in accordance with embodiments of the present invention. The needle 100 may be used to aspirate sample 5 from a sample source 7 for injection into an analytic flow path and eventually to a column for chromatographic analysis. The position shown in FIG. 7 is an aspirate position of the needle 100, which has pierced a seal 8 of the sample source 7, such as a well plate, for aspirating the sample 5. Embodiments of the autosampler 200 (e.g. sample manager) may include a sample compartment 80 and an injection valve 81, as well as other features and components of an autosampler for liquid chromatography applications. Embodiments of the injection valve 81 may be inject the sample 5 into an analytic flow path of the liquid chromatography system to a column for chromatographic analysis. Embodiments of the sample compartment 80 may be configured to receive at least one sample source 7 having a seal 8. For example, the sample compartment 80 may house, receive, or otherwise cooperate with an array of wellplates containing sample 5. Components of autosampler 200, such as a process sample manager, may automatically programmatically obtain sample 5 from the sample sources 7, for ultimately injecting into the column via the injection valve 81.

The needle 100 may be a part of the sample compartment 80 for cooperating with the sample source containers 7. For instance, the needle 100 may be housed within the sample compartment 80 of the autosampler 200 for liquid chromatography processes. Moreover, the needle 100 may be fluidically connected to the injection valve 81, wherein the needle 100 may be configured to aspirate the sample 5 from the at least one sample source 7 by piercing the seal 8 of the at least one sample source 7, and then inject the sample 5 into the analytic flow path of a liquid chromatography system.

Figure 11:
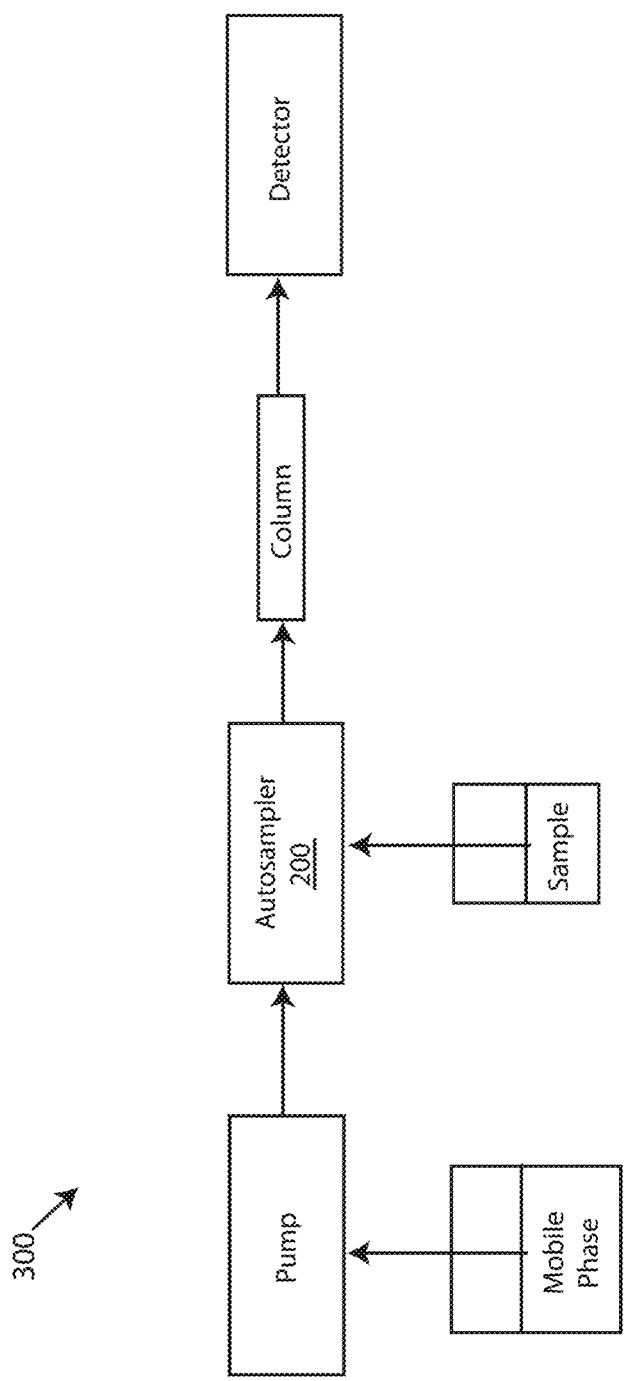
FIG. 11 depicts a schematic diagram of a liquid chromatography system, in accordance with embodiments of the present invention.

FIG. 11 depicts a schematic diagram of a liquid chromatography system 300, in accordance with embodiments of the present invention. Embodiments of a liquid chromatography system 300 may include a mobile phase, such as a solvent reservoir/source, one or more pumps, the autosampler 200 in fluid communication with the sample, a column, and a detector, as known to those skilled in the art of liquid chromatography.

Referring now to FIGS. 1-11, a method of improving a piercing performance of a needle 100 in a liquid chromatography system 200 may include reducing a coefficient of friction of the needle 100 by forming a rough textured surface region 20 on an exterior surface of the needle 100, such that when the needle pierces a seal 8 of a sample source 7, the seal 8 does not cling to the rough textured surface region 20 of the needle 100 as a result of the reduced coefficient of friction.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A needle comprising:
a needle body including a tip and a conical section adjacent to the tip, the conical section having a textured surface that is offset from the tip of the needle body, the tip having a non-textured, smooth surface;
wherein the needle is configured to aspirate a sample from a sample source and inject the sample into a liquid chromatography system.

2. The needle of claim 1, wherein the textured surface reduces a coefficient of friction of the needle body and the non-textured, smooth surface of the tip maintains a liquid tight seal between the tip of the needle body and an injection seat when the needle injects the sample into an analytic flow path of the liquid chromatography system.

3. The needle of claim 2, wherein the textured surface is offset from the tip of the needle body at least 0.010 inches.

4. The needle of claim 1, wherein the textured surface is a rough textured surface finish having a surface roughness Ra greater than 15µ inch.

5. The needle of claim 1, wherein the textured surface reduces the coefficient of friction of the needle body to avoid a seal material covering the sample source from clinging to the needle body as the needle enters and exits the sample source.

6. The needle of claim 1, wherein the needle body is comprised of metal or a metal alloy.

7. The needle of claim 1, wherein the textured surface is formed by bead blasting the needle body.

8. The needle of claim 1, further comprising: an inner bore providing a fluidic pathway of the sample through the needle body, and an opposing attachment end for attaching to a component of an autosampler of the liquid chromatography system.

9. The needle of claim 8, wherein the inner bore has a max diameter of 0.01 inches.

10. The needle of claim 1, wherein a roughness Ra of the textured surface is between 15µ inch and 30µ inch.

11. The needle of claim 1, wherein the textured surface extends at least 2 inches from the non-textured, smooth surface finish of the tip of the needle body, along an exterior surface of the needle body.

12. The needle of claim 1, wherein the non-textured, smooth surface has a higher coefficient of friction than the textured surface.

13. The needle of claim 1, wherein a circumference of the tip gradually reduces towards an end face of the tip.

14. The needle of claim 1, wherein an end face of the tip is perpendicular to a longitudinal axis of the needle body.

15. An autosampler of a liquid chromatography system, comprising:
an injection valve for injecting a sample into an analytic flowpath of the liquid chromatography system;
a sample compartment, the sample compartment configured to receive at least one sample source having a seal; and
a sample needle fluidically connected to the injection valve, the sample needle configured to aspirate the sample from the at least one sample source by piercing the seal of the at least one sample source, and then injecting the sample into the analytic flowpath of the liquid chromatography system;
wherein the sample needle has a conical section with a textured exterior surface that is offset from a tip of the needle body, the tip having a non-textured, smooth surface.

16. The autosampler of claim 15 wherein the textured exterior surface reduces a coefficient of friction due to the textured exterior surface, which hinders stretching and sleeving of the seal as the sample needle enters and exits the at least one sample source.

17. The autosampler of claim 15, wherein the non-textured, smooth surface of the tip maintains a liquid tight seal between the tip of the sample needle and an injection seat when the sample needle injects the sample into the analytic flow path of the liquid chromatography system.

18. A method of improving a piercing performance of a needle in a liquid chromatography system, the method comprising:

reducing a coefficient of friction of the needle by forming a rough textured surface region on an exterior surface of a conical section of the needle, such that when the needle pierces a seal of a sample source, the seal does not cling to the rough textured surface region of the needle as a result of the reduced coefficient of friction, wherein the rough textured surface region is offset from a tip portion of the needle having a non-textured, smooth surface;

wherein the needle is configured to aspirate a sample from the sample source and injects the sample into the liquid chromatography system.

19. The method of claim 18, wherein the rough textured surface region has a roughness Ra between 15μ inch and 30μ inch.

* * * * *